Nov. 11, 1958 P. J. BREWINGTON 2,859,777

LEAK PREVENTING CAP FOR PNEUMATIC VALVE STEMS

Filed Feb. 14, 1958

INVENTOR.
PHILIP J. BREWINGTON.
BY Henry H. Snelling

United States Patent Office 2,859,777

Patented Nov. 11, 1958

1

2,859,777

LEAK PREVENTING CAP FOR PNEUMATIC VALVE STEMS

Philip J. Brewington, Austin, Tex.

Application February 14, 1958, Serial No. 715,316

2 Claims. (Cl. 138—89.2)

This invention relates to closures for pneumatic valve stems, particularly those which simultaneously serve to prevent dust from getting into the valve and to prevent loss of pressure should the valve leak, as from an automobile tire, for example. The principal object of the invention is to provide such a closure that can readily be applied without rotation of the closure on the external threads of the stem.

A further object of the invention is to have such closure indicate leakage of air and if so the relative extent of the leakage.

Another object of the invention is to add to these features means whereby when the closure includes a sleeve and a tubular rubber bag secured at its mouth to the sleeve and the leakage is of such considerable amount that the closed end of the bag will balloon and therefore tend to lessen the thickness of the wall of the bag, the bag will anchor itself to the sleeve beyond the end of the valve stem to resist the tendency to outward movement.

The usual valve structure 1 having a threaded stem 2 is shown as being a part of an automobile tire. The outer member of the closure 3 is a steel sleeve 4 flared as at 5 to form a slight skirt at its lower end and open at its other or upper end.

Figure 1:
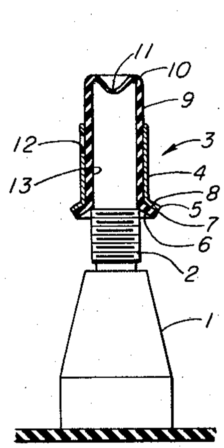
Fig. 1 is a central section with the closure ready to be applied to the valve stem.
Figure 2:
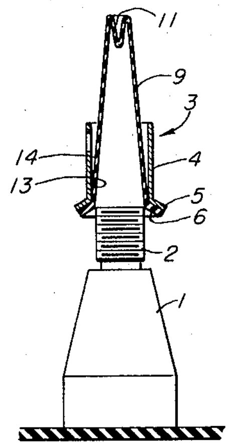
Fig. 2 is a similar section but showing the bag extended for insertion of the closure on the valve stem.
Figure 3:
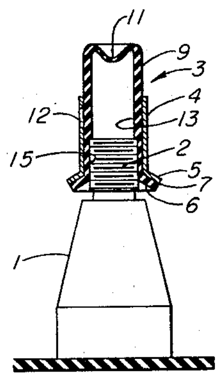
Fig. 3 is a central section showing the closure completely in place.

A highly elastic bag 9 of generally cylindrical shape much like a finger stall is permanently secured to the flaring skirt 5 of the metal sleeve 4 only at its lower end which flares as at 6 to be parallel to skirt 5. These parts may be secured together by a suitable adhesive 7 or the rubber may be vulcanized direct to the flaring skirt 5. The rubber bag 9 may have the same wall thickness throughout but it is a bit preferred to make the bottom 10 of the inverted bag. Any excess pressure in the elastic bag 9 the bottom indented as at 11 so that normally the bag would assume the shape shown in Figures 1 and 3. Stretching the bag 9 as shown in Fig. 2 for ready insertion over the threaded stem 2 forms an annular tapered space 14 and also thins and stretches the wall 13 to such an extent that the inside diameter of the bag becomes greater than the outside diameter of the threaded valve

2 stem 2 so the parts may readily telescope. When, however, the bottom of the inverted bag is released and the closure moves down to the position shown in Fig. 3, the wall 13 of the rubber bag will expand in thickness while contracting in length and will grasp firmly the threaded stem 2 locking into the grooves between the threads to provide a firm anchor for the closure.

Figure 4:
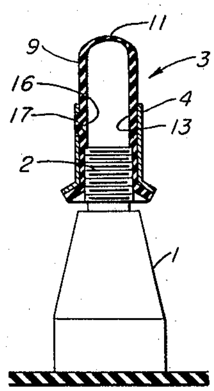
Fig. 4 shows the closure indicating a slight leak.
Figure 5:
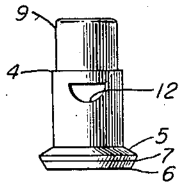
Fig. 5 is a side elevation of the closure.
Figure 6:
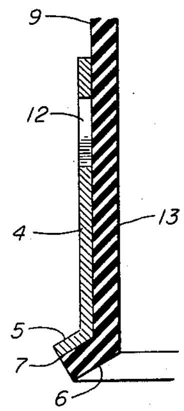
Fig. 6 is a radial section taken on Fig. 1 but on a larger scale.
Figure 7:
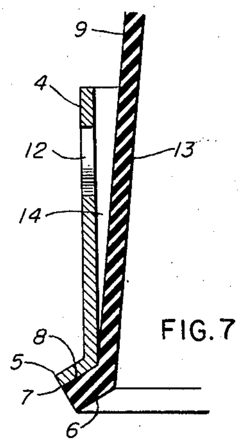
Fig. 7 is a similar radial section taken on Fig. 2.
Figure 8:
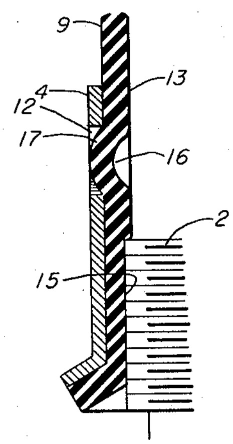
Fig. 8 is a radial section on the same scale as Figs. 6 and 7 where there is slight leakage as in Fig. 4.

One or more side openings 12 are provided in the metal sleeve 4, these openings preferably having a lower curved wall nearer the stem 2 and a horizontal wall at its upper portion so that the horizontal wall of the opening is parallel to the plane of the rim of the stem. The shape of the opening is best seen in Fig. 5 and its use is clear from Fig. 8, which is an enlarged view of a portion of Fig. 4 showing the parts as they would appear if there were a slight leak through the valve stem 2 sufficient to dome the top of the closure which is the bottom of the inverted bag. Any excess pressure of the elastic bag 9 will cause the wall of the bag to tend to blow out through the opening 12 as indicated at 17 on the outside and 16 on the inside and the extent of this penetration will vary with the inside pressure and the amount of leakage of air.

The operation is as follows: With the parts in the position shown in Fig. 1 the bottom 10 of the inverted elastic bag is pulled sharply upward as indicated in Fig. 2 and the closure is then pushed down on the stem 2 to the extent desired. Upon lowering of the closure and releasing the tension on the bag the parts assume the position shown in Fig. 3 with the closure firmly in place as a dust cap. Should there be a slight leak the indentation 11 would be reversed forming a dome as in Fig. 4, this indicating a slight leak. Should the leak continue, however, the portion of the bag above the sleeve 4 will expand like a balloon and indicate very clearly that the leak is worthy of attention. Such action would tend to pull the rubber bag away from the stem. To prevent this, the openings 12 are provided so that pressure inside of the bag will indent the bag as at 16 forming a boss 17 which engages the opening 12 and anchors the bag to the sleeve, the horizontal top edge greatly aiding in so holding the bag.

What I claim is:

1. A cap to close an externally threaded valve stem, comprising a sleeve and a flexible bag having a mouth and being secured all around its open end only to the sleeve, the bag extending beyond the sleeve and so being free to expand when air under pressure is admitted to the secured mouth of the bag, said valve stem fitting within the mouth of the bag, the thickness of the bag being such that as the bag is stretched by pulling on the bottom of the inverted bag, the sleeve and the bag will leave an annular space around the stem and when the bottom of the bag is released the wall of the bag will decrease in length and increase in radial thickness and will enter the grooves of the threads and thus anchor the cap to the stem.

2. The combination of a rubber bag with a metal member to secure the rubber bag to an externally threaded pneumatic valve stem, said member comprising a cylindrical sleeve outwardly flared at one end to form a skirt and having its other end in a plane at right angles to the axis of the cylinder, said sleeve having in the wall thereof proximate said other end a plurality of openings, the margins of each of which nearest the said other end are in a plane parallel to the first mentioned plane, thereby to resist thinning of the bag wall proximate the valve stem, the rubber bag being secured to the skirt only and free to move away from the cylindrical wall portion of the sleeve when the bottom of the inverted bag is pulled away from the skirt, thereby making the wall of the bag thinner.

References Cited in the file of this patent

UNITED STATES PATENTS

| | | |
|---|---|---|
| 1,141,219 | Stadelman | June 1, 1915 |
| 1,270,073 | Thiem | June 18, 1918 |
| 1,492,077 | Kraft | Apr. 29, 1924 |
| 1,662,968 | Garrett | Mar. 20, 1928 |
| 2,570,108 | Gallot et al. | Oct. 21, 1951 |

FOREIGN PATENTS

| | | |
|---|---|---|
| 175,374 | Great Britain | of 1902 |